Nov. 10, 1931.  G. S. NEELEY  1,831,076
APPARATUS FOR PURIFYING WATER
Filed Jan. 15, 1927   5 Sheets-Sheet 3
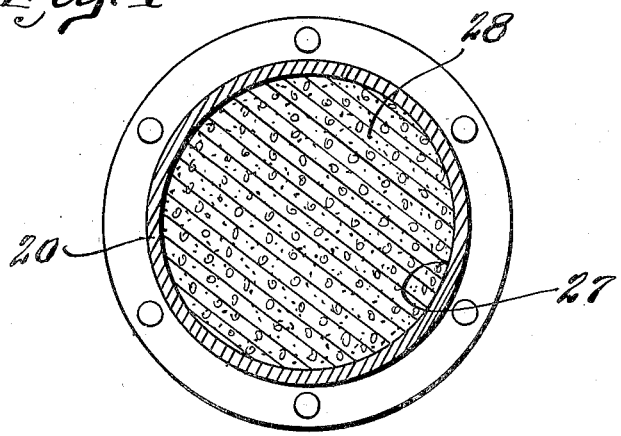
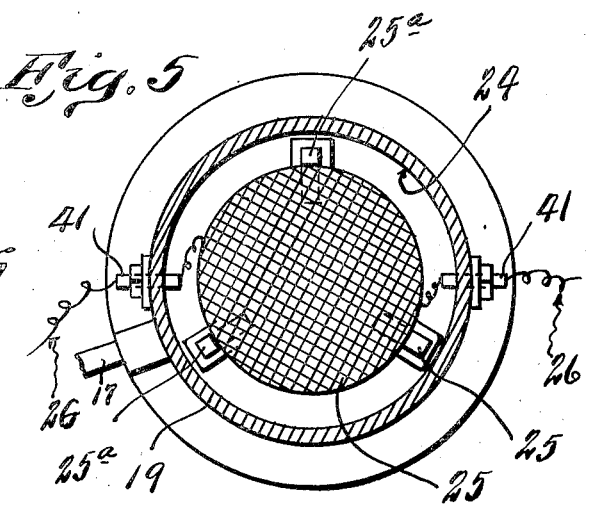
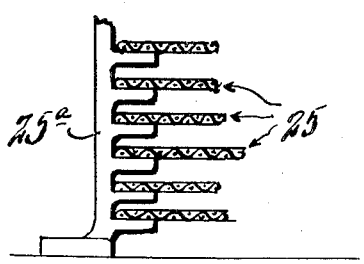
Inventor
George S. Neeley

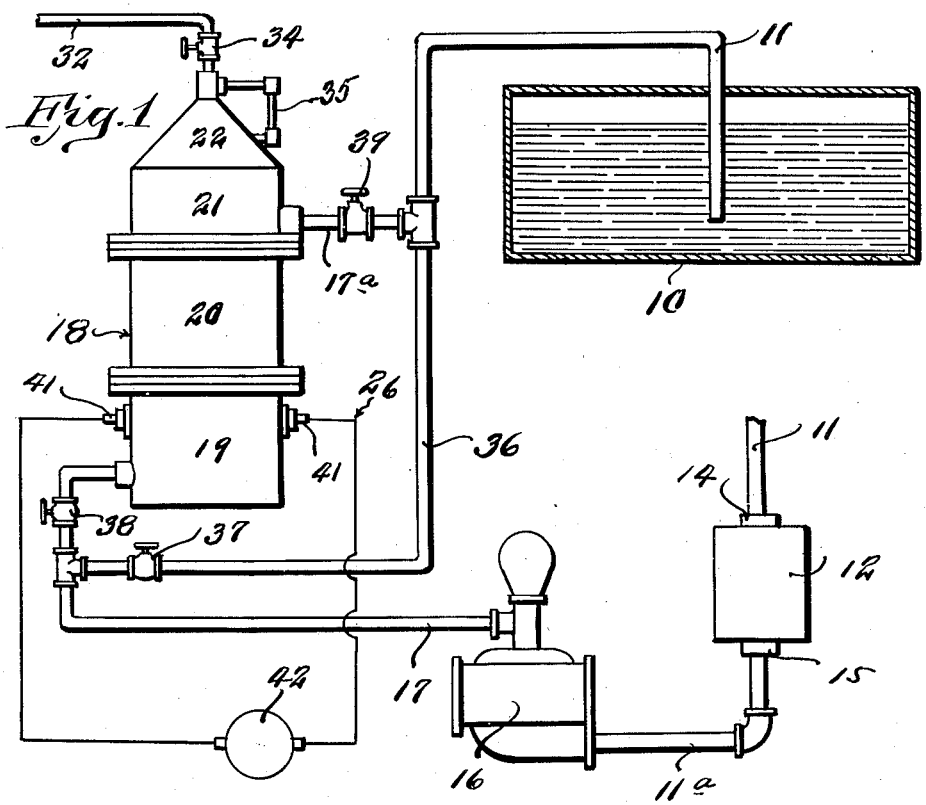
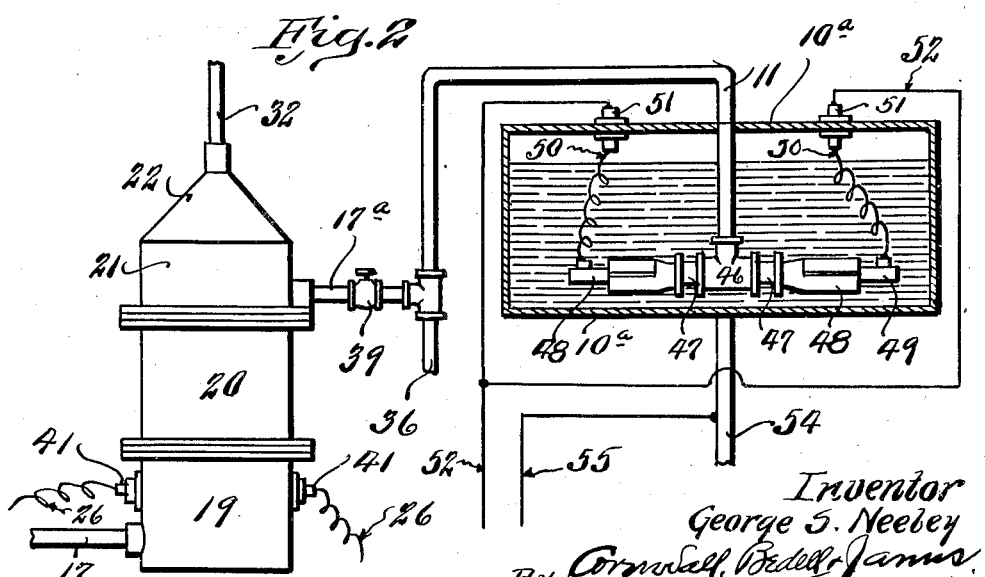

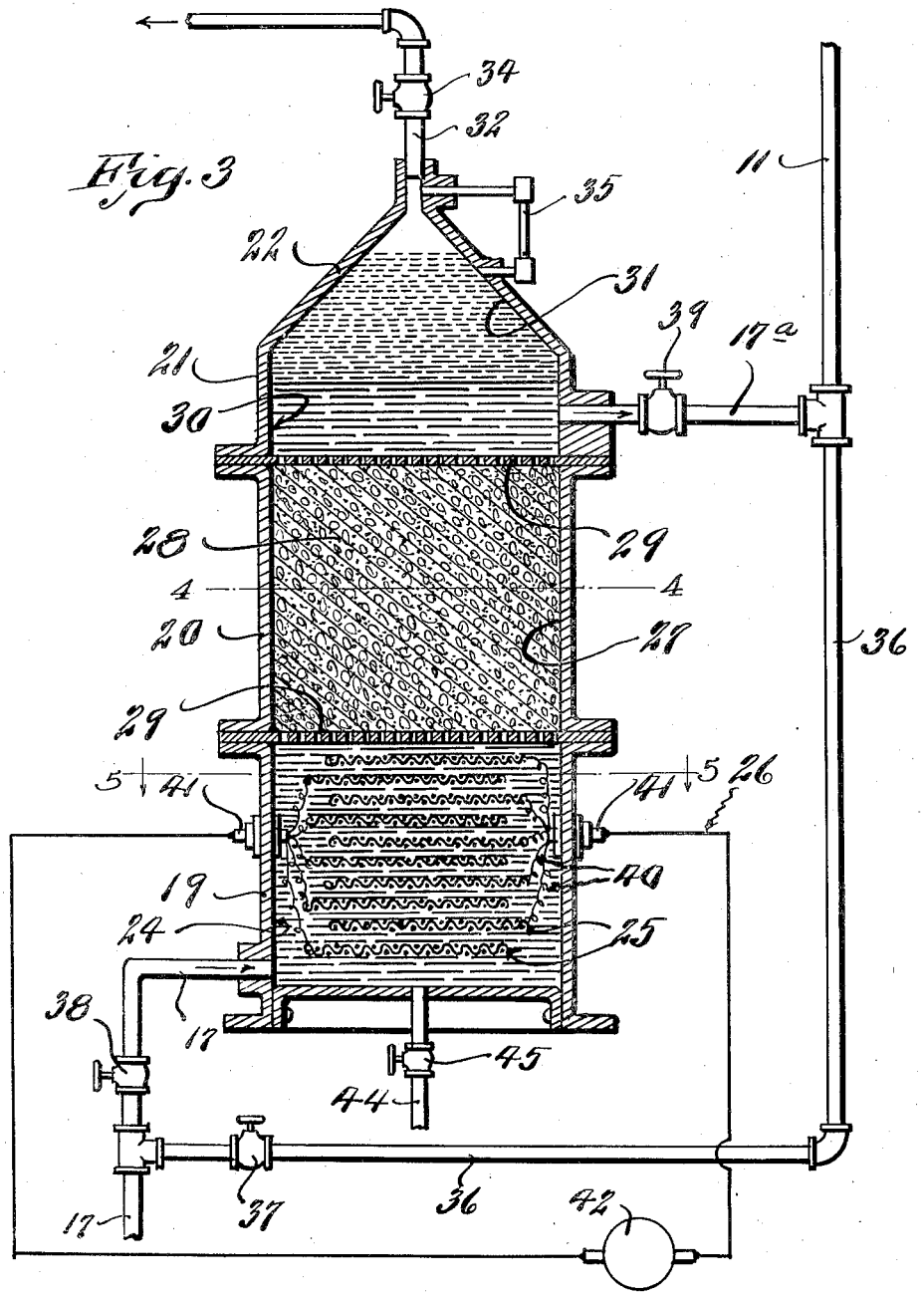

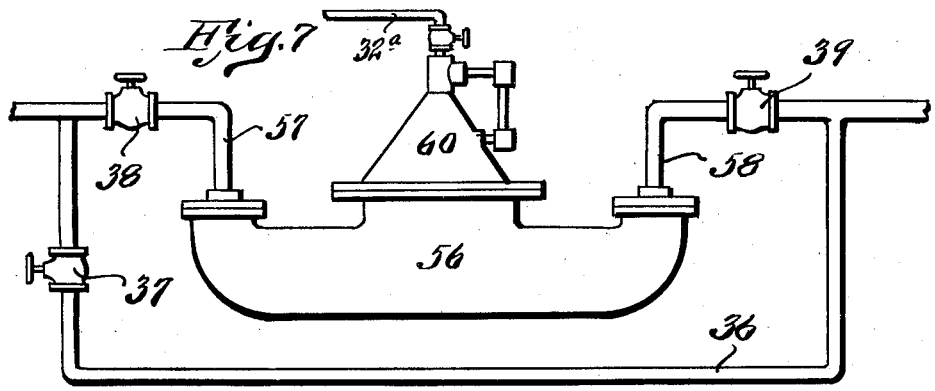
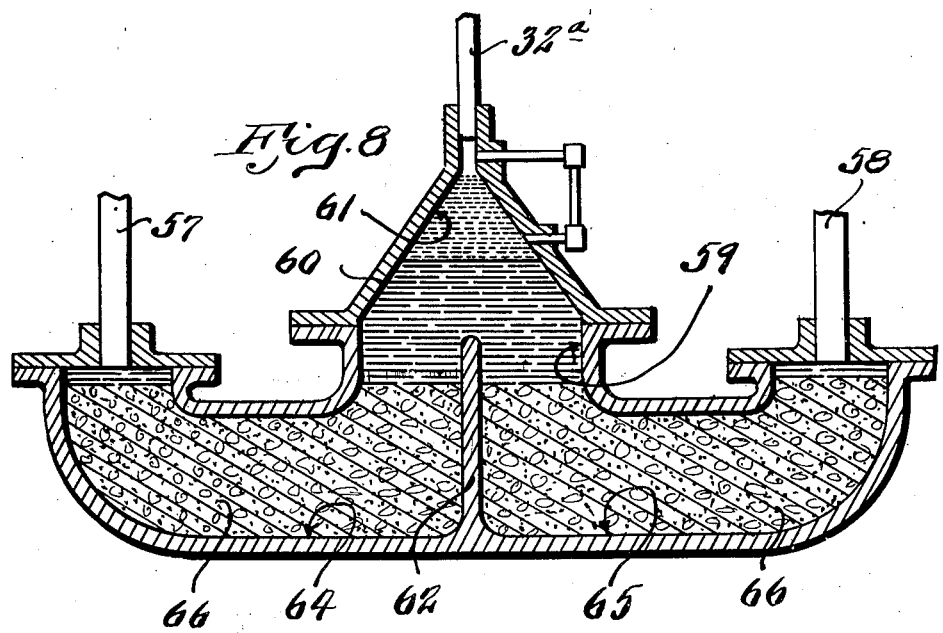

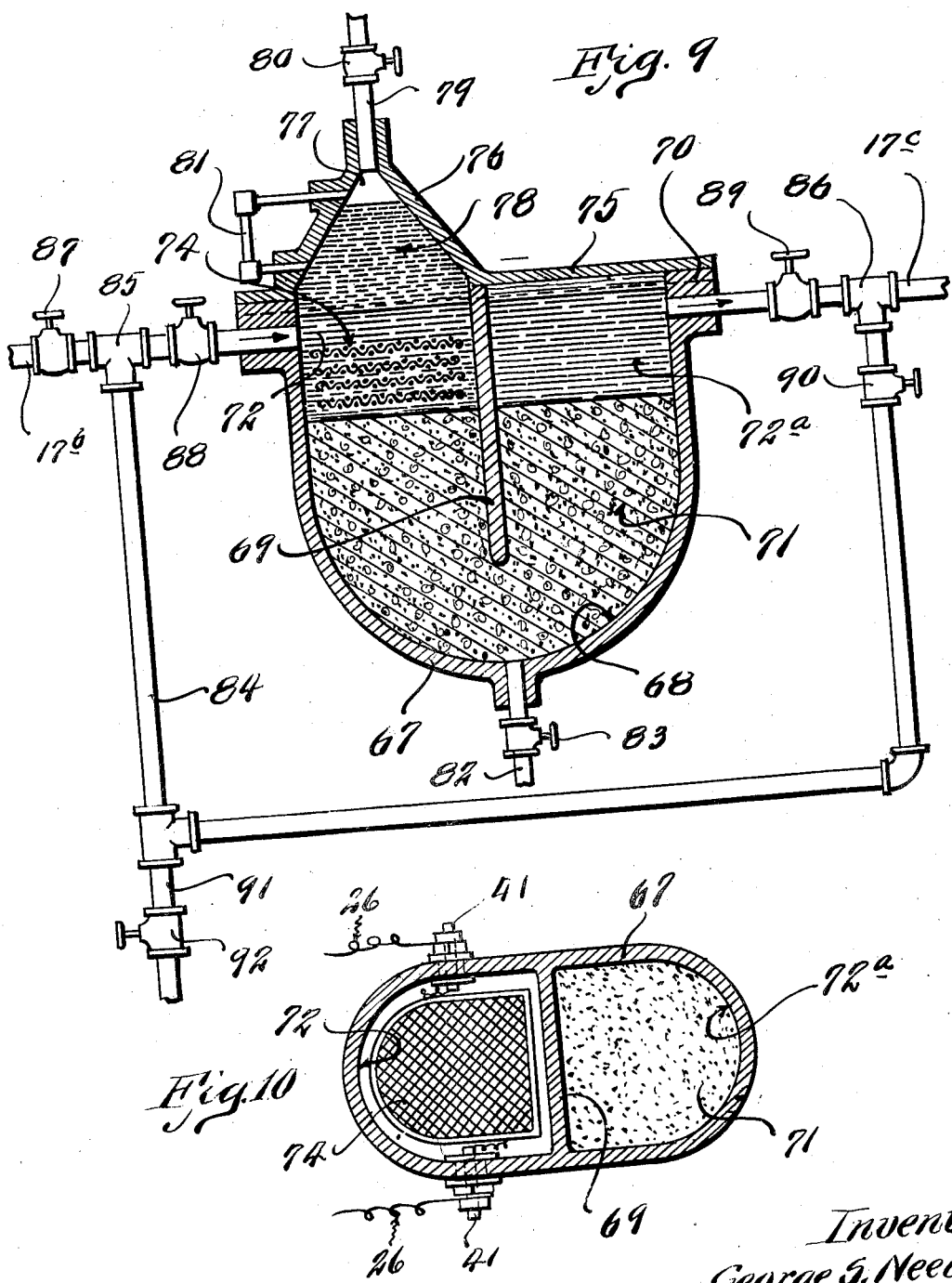

Patented Nov. 10, 1931

1,831,076

UNITED STATES PATENT OFFICE

GEORGE S. NEELEY, OF HARTFORD, ILLINOIS, ASSIGNOR OF ONE-HALF TO GRIFFIN WATKINS, OF ALTON, ILLINOIS

APPARATUS FOR PURIFYING WATER

Application filed January 15, 1927. Serial No. 161,270.

This invention relates to new and useful method of and apparatus for the purification of water.

The primary objects of the invention are to remove from the water various impurities by causing the water to traverse a suitable apparatus constructed in accordance with my invention, whereby said water is acted upon and the impurities separated therefrom.

Other objects of the invention are to so construct the apparatus that liquids of different specific gravities may be separated from each other and discharged therefrom independently of each other.

Other objects of the invention are to provide a container for electro-chemically treating and filtering the water passing therethrough, said container having a chamber located above the level of the water, for collecting therein and separating from the water oil and other substances floating in the feed water, thereby providing a compact device which is of maximum efficiency and occupies minimum space.

Still other objects of the invention are to provide a collecting chamber in the feed water pipe of the boiler, whereby air, gases, and acids contained in the feed water are separated therefrom and trapped in said chamber.

Still other objects of the invention are to provide an apparatus having a plurality of compartments through which the water is compelled to pass and which are arranged so as to affect the water in a predetermined manner in order to rid said water of various impurities.

Further objects of the invention are to provide a novel method of separating liquids of different specific gravities and of purifying such liquids by means of filtration and electro-chemical action.

Still further objects of the invention are to separate oil from the feed water supply of steam boilers before the admission of the water to the boiler.

Additional objects of the invention are to provide a novel method of and apparatus for treating the feed water of steam boilers whereby the cylinder oil is extracted from the feed water before the admission of the latter to the boiler and the water is further treated so as to remove therefrom chemical substances which are responsible for the formation of scale in the boiler.

With these and other objects in view, my invention consists in certain novel features of construction and arrangement of parts, hereinafter more fully described and claimed, and illustrated in the accompanying drawings, in which—

Figure 1 is a diagrammatic view showing my improved apparatus connected to the feed water pipe connections of a steam boiler and showing electrical circuit for said apparatus.

Figure 2 is a similar view but showing connections for treating the feed water upon its discharge into the steam boiler.

Figure 3 is an enlarged vertical cross section through the apparatus and showing the pipe connections thereof.

Figure 4 is a horizontal section taken on line 4—4 of Figure 3.

Figure 5 is a horizontal section taken on line 5—5 of Figure 3.

Figure 6 is a fragmental detail view showing a support for the electrode plates.

Figure 7 is a side elevational view of a modified form of my invention.

Figure 8 is an enlarged vertical section of same.

Figure 9 is a vertical section through another modified form.

Figure 10 is a plan view, partly in cross section, of same.

The present invention is designed for treating and purifying water or other liquids. However, in the present instance it is illustrated and described as applied to the feed water system of steam boilers.

In the present invention I provide a container of comparatively large diameter or carrying capacity than that of the feed water means in which it is interposed, thereby slowing down the velocity of the feed water when traversing the same. A chamber is provided in this container, said chamber being arranged above the path of the feed water flow and at different horizontal plane with respect to the inlet and outlet connections of said container, thereby providing a chamber of large storage capacity as compared with the size of the feed water lines, for collecting and separating from the water, under conditions of temperature and pressure, oil and other fluids contained in said water.

A suitable blow-off pipe is connected to the apex of the storage chamber by means of which the oil may be drawn off. Thus it will be noted that I prefer to extract the oil directly from the feed water supply and not from the exhaust steam as is the present practice method. In this manner oil can be more easily and positively separated from the water due principally to the natural differences in the specific gravities of water and oil.

By interposing the apparatus in the feed water lines between the boiler feed pump and the boiler, the oil, which usually gets into the feed water supply along with the condensate from the cylinders of the engines and boiler auxiliaries, is extracted from the water before the admission of the latter into the boiler, thereby preventing the entrance of the oil into the boiler and eliminating injury to the boiler plates, such as burning or blistering of the plates, which is usually caused by oil being admitted into the boiler.

This chamber not only serves to trap oil and substances floatable in the feed water, but also serves as a collecting chamber for gases contained in said water. The vessel or container through which the water passes is of sufficient dimensions, as compared to the rate of flow of the water, to cause said water to slow down considerably when passing therethrough, so that deaeration of the water can take place and air and oxygen contained in said water can be released and collected in said collecting chamber. Other gases, such as carbonic acid, ammonia, present in the feed water are also released and trapped in said collecting chamber and separated from the feed water before the admission of the latter to the boiler.

The apparatus is further provided with suitable filtering medium through which the water is compelled to pass and in addition to this, electrical means may be provided in said container for electrically charging said feed water so as to cause coagulation and separation of chemical substances held in solution in said water.

In this manner, the feed water is freed of all impurities having injurious affect on the boiler or its auxiliaries. Particularly chemical matter normally held in solution in the feed water and having tendency to form scale on the metal surfaces under the influence of thermo-electric current generated by the operating conditions of the boiler is thus eliminated from the feed water. No attempt is made in the present application to discuss the principles involved in the generation of this thermo-electric current, and its effects on the scale matter contained in the feed water, as the same is fully described in my copending applications Serial No. 70,655, filed November 29, 1925, and Serial No. 103,079, filed April 19, 1926.

Referring by numerals to the accompanying drawings, which illustrate diagrammatically my improved method and apparatus, 10 indicates a water container, in the present instance, a boiler having a feed water pipe 11 leading thereinto. The feed water is generally heated before being admitted into the boiler by means of a heater 12 which in the drawings is shown interposed in the pipe connection 11 having an inlet 14 and an outlet 15. From the heater pipe section 11ª conveys the water to a pump 16 which is used to force the feed water under pressure into the boiler. In the present instance, a pipe connection 17 leads from the pump and connects to one end of a closed vessel 18. This latter preferably consists of three sections 19, 20, and 21, the latter having its upper end terminating in a cone-shaped top 22. Pipe 17 leads into a chamber 24 formed in section 19 and located in this chamber is a series of suitable electrodes 25 which are electrically excited by means of an electric circuit 26 so that the water passing through said chamber 24 is affected by the electric current, thereby causing the chemical substances contained in the feed water to be subjected to electro-chemical action and separated from the water. From chamber 24 the water then passes upwardly into a chamber 27 formed in section 20 and containing a suitable filtering material 28.

The water in passing through chamber 27 is filtered and such foreign substances as are contained in the water are retained in said chamber 27. The filtering medium 28 may consist of any desired material, such as fine gravel, and is preferably retained in section 20 by means of perforate plates 29 secured to the ends of said section. The top section 21 is provided with a chamber 30 which terminates in a cone-shaped chamber 31. A pipe 17ª leads from chamber 30 and is connected to inlet pipe 11 for conveying the water from said chamber 30 into the boiler 10. Pipe 17ª is arranged a suitable distance below chamber 31 in order to maintain the level of the water in chamber 30 below chamber 31. Consequently oil and other fluids contained in the water and of higher specific gravities than the latter will rise above the pipe connections 17ª and collect in the cone-shaped chamber 31, thereby separating such fluids from the feed water before the latter is admitted to the boiler.

Leading from the apex of chamber 31 is a discharge pipe 32 having a valve 34 for controlling the same so that by opening said valve the oil and other liquids collected in chamber 31 may be discharged through pipe 32. A glass gauge 35 is arranged in section 22 to indicate the level of oil and other liquids in chamber 31. A by-pass pipe connection 36 is arranged between pipes 17 and 17ª so that the feed water may be conveyed from the pump to the boiler without traversing member 18 when so desired. A valve 37 is arranged in by-pass connection 36 so as to shut off said by-pass connection when it is desired to treat water. A valve 38 is arranged in pipe 17 at a point between by-pass connection 36 and section 19 and a valve 39 is arranged in pipe connection 17ª between section 21 and by-pass connection 36.

When the apparatus is in operation, valve 38 and 39 are open and valve 37 is closed. When it is desired to by-pass the feed water, as for instance in cleaning the apparatus 18, valves 38 and 39 are closed and valve 37 opened.

In the operation of the apparatus, the feed water is forced successively through the various chambers of member 18 and is subjected to various treatments for separating and removing the impurities from the water. Thus in chamber 24 feed water is subjected to electrical treatment which affects the chemical substances contained in the water and causes coagulation or fixation thereof. In passing through chamber 27, such foreign substances which have passed through chamber 24 are arrested by filtering material 28. Upon entering chamber 30, oil and other fluids of higher specific gravities rise above the level of the water, which latter is maintained at or slightly above the horizontal plane of pipe 17ª. Thus oil and other light fluids are collected in cone-shaped chamber 31 and are trapped thereby and prevented from entering the boiler. From chamber 31 such collected fluids are discharged by pipe connection 32.

Electrodes 25 are connected by electrical connections 40 to suitable plugs 41 which are arranged in the side wall of section 19 and are insulated therefrom and from each other. Connected to these plugs are the terminals of circuit 26 which latter is connected to a source of electrical energy which, in the present instance, is in the form of generator 42. A discharge pipe 44 leads from the lower end of section 19 and is provided with a valve 45. Thus when the latter is opened, sediment collected on the bottom of section 19 may be blown off through said pipe 44.

Either alternating or direct current may be used to energize electrodes 25. When direct current is used, electrodes 25 which are in the form of horizontally disposed screens arranged in superimposed spaced relation with each other are electro-plated with the chemical matter contained in the feed water, thereby positively fixing such matter on said plates, and it is necessary to remove said plates at stated periods for cleaning purposes.

When alternating current is used, electrodes 25 cause the foreign matter contained in the feed water to be coagulated. Most of this coagulated matter is deposited on the bottom of section 19 and such coagulated matter which escapes into section 20 is retained therein by the filtering medium 28.

Electrodes 25 are preferably supported and held in spaced insulated relation with each other by means of supports 25ª which are formed of insulating material and are arranged in chamber 24 as shown in Figure 5.

In the modified form shown in Figure 2, the discharge end of pipe 11 is provided with a T-connection 46 to which are secured short pipe sections 47 which terminate in open-ended enlarged tubular member 48. An electrical distributor 49 is arranged in each member 48 and is insulated therefrom and electrically connected by means of wires 50 to plugs 51 which are disposed in the shell of the boiler and insulated therefrom. Plugs 51 are connected to a supply line 52 and a blow-off pipe 54 of the boiler is electrically connected to the other supply line 55. Supply lines 52 and 55 are connected to a suitable source of electrical current, preferably alternating current. The feed water is discharged into the boiler through members 48 and upon coming in contact with distributors 49 completes the circuit therebetween and the boiler shell 10 and is thus electrically charged with alternating current which counteracts the thermo-electric current generated by the operating conditions of the boiler. The functions of this circuit is to stop any and all tendency on the part of the thermo-electric current to "pit" the tubes and plates of the boiler. In this manner the feed water of steam boilers may be treated electrically by electric circuit 26 before the admission of the water into the boiler and may be further treated during its discharge into the boiler by the electric current supplied by lines 52 and 55.

In the modified form of my apparatus shown in Figures 7 and 8, a closed container 56 is disposed horizontally and has one end connected to an inlet feed pipe 57 and the opposite end to an outlet feed pipe 58. The central portion of vessel 56 is formed with an enlarged flanged opening 59 which is closed by a coneshaped extension 60, thereby forming a cone-shaped chamber 61 which communicates with the interior of vessel 56 and is traversed by water admitted to said vessel through pipe 57 and discharged therefrom through pipe 58.

A baffle plate 62 is formed integral with the side walls of vessel 56 and extends a suitable distance upwardly into the flanged opening 59, thereby dividing the interior of vessel 56 into two chambers 64 and 65. These chambers are filled with suitable filtering material 66 through which the feed water is forced to pass during its travel through said vessel. In traversing chamber 59 oil and other fluids of higher specific gravities separate from the feed water and collect in the cone-shaped chamber 61 from which said fluids may be discharged by a discharge pipe 32$^a$ leading outwardly from the apex of said chamber 61.

In the modified form shown in Figures 9 and 10 the vessel 67 is of more condensed form having a chamber 68 of U-shape with a partition wall 69 formed integral with said vessel and disposed transversely thereof. The upper end of this wall is flush with the open flanged end 70 of said vessel and the lower end of said partition wall terminates short of the bottom of vessel 67 so as to allow the water to pass from one end to the other. This chamber 68 is filled with suitable filtering material 71 the level of which is disposed a suitable distance below the end 70 so as to provide a chamber 72 in the intake end of chamber 68 for receiving a series of screens or electrodes 74. These electrodes are connected by suitable plugs 41 to electrical connections 26 and are used to electrically treat the water so as to effect the chemical matter contained therein.

The flanged end 70 is closed by a cover 75 having an extension 76 disposed above chamber 72 so as to form a collecting chamber 77. Extension 76 is preferably cone-shape and leading from the apex of said extension is a discharge pipe 79 having a valve 80. The water upon being admitted to chamber 72 through inlet pipe connection 17$^b$ is brought in contact with electrodes 74 which are electrically charged and cause the chemical matter to be coagulated or electro-plated on said screens. The water is then filtered through the filtering material 71 which separates from the water such matter as is not amenable to the electric treatment and said water is then discharged from chamber 72$^a$ through discharge pipe 17$^c$.

Oil and other fluids, such as gases contained in the water, upon being admitted with the latter into chamber 72 rise and enter chamber 77 which latter is disposed above the level of the water. Thus all the fluids of higher specific gravity than water are separated therefrom and collected in chamber 77 from which they may be then discharged through pipe 79. Leading from the lowermost portion of vessel 67 is a discharge pipe 82 having a valve 83 through which the vessel may be drained when so desired.

A by-pass connection 84 is connected at 85 to intake connection 17$^b$ and at 86 to outlet connection 17$^c$ so that the water may be by-passed through said connection when it is not desired to have the water traverse container 67. To this purpose, a valve 87 is arranged in intake pipe 17$^b$ ahead of connection 85 and a valve 88 is arranged in intake pipe connection 17$^b$ at a point between connection 85 and a container 67 while a valve 89 is arranged in outlet pipe 17$^c$ at a point between said vessel and connection 86 so that by closing valves 88 and 89 the supply of water to pipe 17$^c$ is uninterrupted by means of by-pass connection 84 and container 67 may be dismantled for cleaning or repair purposes.

A valve 90 is arranged in by-pass connection 84 which when the vessel is in use is closed to prevent by-passing of water through connection 84. A discharge pipe 91 is connected to by-pass connection 84 and is normally closed by a valve 92. If it is desired to wash out the container 67 valves 87 and 90 are closed and valves 88, 89, and 92 are opened. The water under pressure is then admitted into the container through pipe 17$^c$ which reverses the normal flow of water through the container and causes the water to be discharged therefrom through the intake chamber 72 and thence through pipe 91. In this manner all the sediment and slush accumulated in chamber 72 is flushed out and if desired filtering material 71 is also washed during this cleaning process.

By the use of my improved apparatus, water may be treated to rid it of various impurities, and particularly chemical matter having tendency to become deposited in the pipe connections and on the metallic surfaces of a water container. Furthermore means are provided for separating from the water gases and other fluids which are injurious to or have tendency to attack the metal parts with which the water comes in contact or which have tendency to scale or become deposited on the metallic surfaces. This treatment does not interfere with the use for which the water is intended and is not injurious as no chemicals are dissolved in the water. The apparatus is of compact size and can be readily interposed in the usual pipe connections.

While I have shown and described the preferred forms of my invention, it is to be understood that various changes can be made in the construction and arrangement of parts of my apparatus without departing from the spirit of my invention.

I claim:

1. An apparatus for purifying water comprising in combination a vertically disposed container consisting of a plurality of tubular sections detachably secured together, the end sections being closed, a series of perforate horizontally disposed partition walls arranged adjacent to the ends of the intermediate section, an inlet connection leading into the lowermost section, a plurality of horizontally disposed screen electrodes arranged in insulated spaced relation in said lowermost section, said electrodes being arranged alternately in two groups, one group being electrically connected to a positive pole and the other group to a negative pole of a suitable source of electric current whereby the water upon admission into said lowermost compartment is subjected to electrical treatment, a filtering material arranged in the intermediate section whereby the water after being electrically treated is caused to traverse said filtering section, a pure water discharge connection leading from the uppermost section, the upper end of said uppermost section being provided with a dome for collecting gases and oil, said discharge connection being arranged in spaced relation with said filtering section and with said dome.

2. An apparatus of the class described comprising in combination a vertically disposed container consisting of an intermediate section, an upper end section, and a lower end section secured together to form a vertically disposed chamber, a pair of perforate horizontally disposed partition walls interposed between the ends of said intermediate section and the respective end sections, thereby dividing said chamber into three communicating compartments, a water inlet connection leading into the lowermost compartment, a plurality of horizontally disposed screen electrodes supported within said lowermost compartment in insulated spaced relation with each other, said electrodes being alternately arranged in two groups, means for connecting one group to a positive pole of a suitable source of electrical current, means for connecting the other group to a negative pole of said source of current, whereby water upon passing through said lowermost compartment is subjected to electric treatment, a filtering material arranged in the intermediate compartment for filtering out the matter from the electrically treated water, a water discharge connection arranged in the uppermost compartment at a point spaced a suitable distance from the upper end thereof, and a discharge connection leading from the uppermost compartment for discharging gas and oil therefrom.

In testimony whereof I hereunto affix my signature this 20th day of December, 1926.

GEORGE S. NEELEY.